June 2, 1925.  1,540,652

F. W. SAKON

TROLLEY WHEEL

Filed Nov. 3, 1924

F. W. Sakon,
INVENTOR

BY Victor J. Evans,
ATTORNEY

Patented June 2, 1925.

UNITED STATES PATENT OFFICE.

FRED WILLIAM SAKON, OF WINDBER, PENNSYLVANIA, ASSIGNOR OF ONE-HALF TO JACOB NEDROW, OF WINDBER, PENNSYLVANIA.

TROLLEY WHEEL.

Application filed November 3, 1924. Serial No. 747,588.

*To all whom it may concern:*

Be it known that I, FRED W. SAKON, a citizen of the United States, residing at Windber, in the county of Somerset and State of Pennsylvania, have invented new and useful Improvements in Trolley Wheels, of which the following is a specification.

This invention relates to improvements in wheels especially adapted for use as trolley wheels, although it may be used as a sheave wheel in rope blocks and the like.

An object of the invention is to provide a wheel having an increased bearing surface so as to provide proper contact for the passage of electric current, means being provided for keeping the bearing surface properly lubricated to reduce friction.

Another object of the invention is the provision of a wheel which is simple and economical in construction and which may be easily and quickly adjusted to take up wear, or readily taken apart and reassembled for the replacement of worn or useless parts.

With the above and other objects in view, the invention further includes the following novel features and details of construction, to be hereinafter more fully described, illustrated in the accompanying drawings and pointed out in the appended claim.

In the drawings:—

Figure 1:
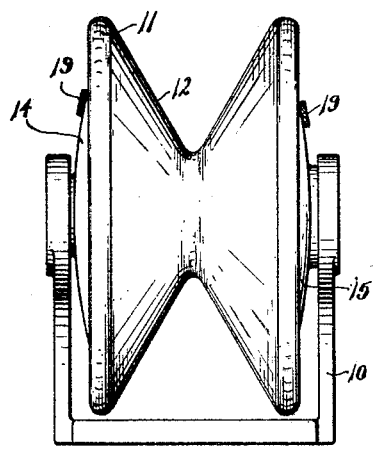
Figure 1 is an edge view of a wheel constructed in accordance with the invention.
Figure 2:
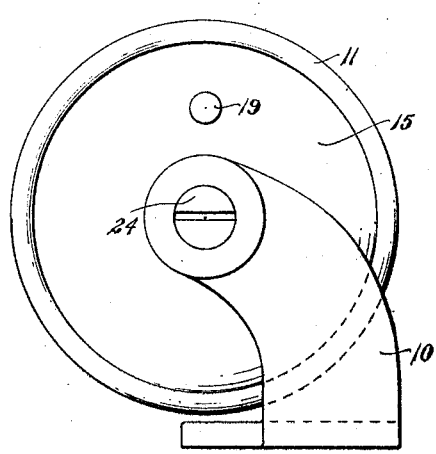
Figure 2 is a side view of the same.
Figure 3:
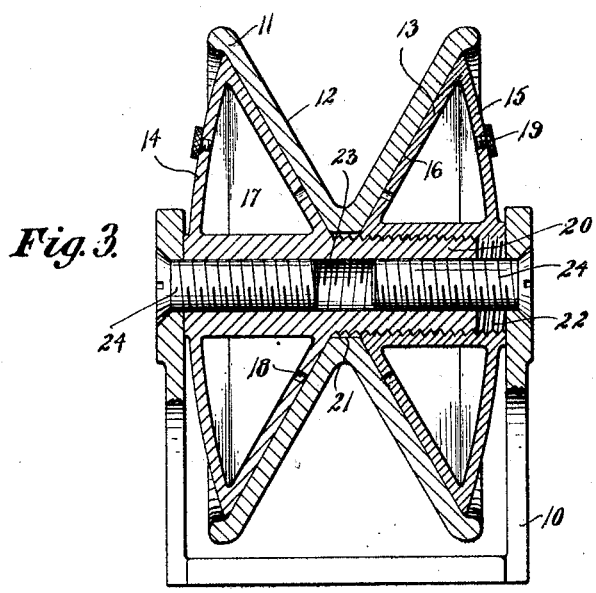
Figure 3 is a sectional view.

Referring to the drawings in detail wherein like characters of reference denote corresponding parts, the wheel which is shown as mounted upon a supporting member, is arranged for use as a trolley wheel and the supporting member therefor consists of a trolley harp 10, the wheel being mounted between the arms of this harp.

The wheel includes a rotatable member 11 which is provided with a substantially V-shaped annular groove 12 to receive the trolley wire. This rotatable member 11 is provided upon its opposite outer faces with outwardly inclined bearing faces 13, so that the rotatable member is substantially V-shaped in cross section.

The rotatable member is supported upon bearing members 14 and 15. These bearing members have their opposed faces inclined to provide bearing faces 16, so that a substantially V-shaped annular bearing groove is provided for the reception of the rotatable member 12. The bearing members 14 and 15 are preferably hollow so as to provide lubricant chambers 17, the opposed walls of these chambers being provided with openings 18 whereby lubricant may pass to the bearing faces 13 and 16. Thus, while a relatively wide bearing engagement is provided between the rotatable member and the bearing members, friction is reduced to a minimum. The bearing members are provided with openings which are adapted to be closed by removable plugs 19 whereby lubricant may be introduced into the lubricant chamber 17.

One of the bearing members, for example the bearing member 14, is provided with a concentrically arranged stud 20 which extends from its inner face through an opening 21 provided in the rotatable member 11. This stud 20 is exteriorly threaded for engagement with the interiorly threaded opening 22 provided in the bearing member 15. The bearing members 14 and 15 may thus be adjustably connected so as to regulate contact with the rotatable member 12 so that the said member may at all times be properly adjusted.

The stud 20 has extending axially therefrom an interiorly threaded opening 23. This opening is adapted to receive threaded studs 24 which extend inwardly through openings provided in the harp 10 and act to support the bearing members.

The construction shown and described provides a trolley wheel having a relatively great bearing surface for the proper conduct of electric current, lubricating means being provided to reduce friction. In addition, the construction is such that the wheel may be readily dismounted or assembled for the purpose of replacing useless parts.

Figure 4:
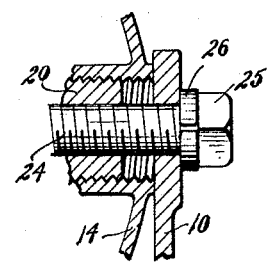
Figure 4 is a fragmentary sectional view illustrating means for locking the threaded studs in position.

In Figure 4 the studs 24 are shown as being provided with a rectangular head 25 and a lock washer 26 is positioned upon the studs between the arms of the harp 10 and the head of the studs so as to securely hold the latter in place. Obviously, various other means may be employed in substitution for the studs 24.

The invention is susceptible of various changes in its form, proportions and minor details of construction and the right is herein reserved to make such changes as properly fall within the scope of the appended claim.

Having described the invention what is claimed is:—

A wheel of the character described embodying a rotatable member having oppositely inclined annular bearing faces, bearing members having opposed bearing faces for engagement with the bearing faces of the rotatable member, an exteriorly threaded stud extending concentrically from one bearing member for adjustable engagement within an interiorly threaded opening provided in the other bearing member, whereby the bearing members may be adjustably connected to provide a substantially V-shaped annular bearing to receive the rotatable member, said stud having an interiorly threaded opening extending axially therethrough, a supporting member and threaded studs extending through the supporting member into the threaded opening for securing the bearing member in position.

In testimony whereof I affix my signature.

FRED WILLIAM SAKON.